(12) United States Patent
Isami et al.

(10) Patent No.: US 12,496,910 B2
(45) Date of Patent: Dec. 16, 2025

(54) BATTERY ELECTRIC VEHICLE

(71) Applicant: TOYOTA JIDOSHA KABUSHIKI KAISHA, Toyota (JP)

(72) Inventors: Yoichiro Isami, Mishima (JP); Kenji Mizutani, Toyota (JP); Akihito Yasue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 18/458,223

(22) Filed: Aug. 30, 2023

(65) Prior Publication Data
US 2024/0208336 A1 Jun. 27, 2024

(30) Foreign Application Priority Data

Dec. 23, 2022 (JP) ................................ 2022-206898

(51) Int. Cl.
*B60L 15/10* (2006.01)
*B60L 15/20* (2006.01)

(52) U.S. Cl.
CPC .............. *B60L 15/10* (2013.01); *B60L 15/20* (2013.01); *B60L 2240/421* (2013.01); *B60L 2240/423* (2013.01); *B60L 2250/26* (2013.01); *B60L 2260/30* (2013.01)

(58) Field of Classification Search
None
See application file for complete search history.

(56) References Cited

U.S. PATENT DOCUMENTS

| | | | | |
|---|---|---|---|---|
| 10,137,906 B2* | 11/2018 | Chen | ................... | B60W 50/085 |
| 10,464,440 B2* | 11/2019 | Suzuki | .................... | B60L 15/20 |
| 11,554,677 B2* | 1/2023 | Isami | ..................... | B60K 26/02 |
| 11,679,757 B2* | 6/2023 | Zhu | ........................ | B60W 10/08 701/22 |
| 11,845,460 B2* | 12/2023 | Oh | ........................ | B60W 50/14 |
| 12,060,071 B2* | 8/2024 | Slattery | .............. | B60W 50/082 |
| 2021/0053487 A1* | 2/2021 | Vangelov | ............... | B60K 35/10 |
| 2021/0229550 A1 | 7/2021 | Isami | | |
| 2024/0083259 A1* | 3/2024 | Ikezawa | .................. | B60L 15/20 |

FOREIGN PATENT DOCUMENTS

| | | | |
|---|---|---|---|
| EP | 2557012 A1 | 2/2013 | |
| JP | 2021-118569 A | 8/2021 | |
| JP | 2024039985 A * | 3/2024 | ............. B60L 15/20 |

* cited by examiner

*Primary Examiner* — Todd Melton
(74) *Attorney, Agent, or Firm* — SoraIP, Inc.

(57) ABSTRACT

Battery electric vehicle includes an accelerator pedal, a shifter, a data management device that manages vehicle characteristic data, and a motor control device that controls an electric motor according to the vehicle characteristic data. The vehicle characteristic data is data configured to change the output characteristic of the electric motor with respect to the operation of the accelerator pedal in accordance with the operation position of the shifter. The vehicle characteristic data includes standard vehicle characteristic data and locked special vehicle characteristic data. The data management device is configured to unlock the special vehicle characteristic data in response to the unlocking condition requiring the predetermined action of the driver being satisfied.

9 Claims, 6 Drawing Sheets

BATTERY ELECTRIC VEHICLE

CROSS-REFERENCE TO RELATED APPLICATION

This application claims priority to Japanese Patent Application No. 2022-206898 filed on Dec. 23, 2022, incorporated herein by reference in its entirety.

BACKGROUND

1. Technical Field

The present disclosure relates to a battery electric vehicle that uses an electric motor as a power device for traveling.

2. Description of Related Art

Japanese Unexamined Patent Application Publication No. 2021-118569 (JP 2021-118569 A) discloses a battery electric vehicle in which a manual transmission operation of a manual transmission vehicle (hereinafter referred to as a MT vehicle) can be simulatively reproduced by controlling a motor torque. In this battery electric vehicle, a plurality of patterns of torque characteristics simulating the MT vehicle is set. A driver can change the patterns of the torque characteristic according to the mood.

SUMMARY

One of the pleasures of driving a MT vehicle is an improvement in driving maneuvers. Even in a case where a driver can drive only a vehicle having low output and a vehicle having a low torque characteristic when the driver is not used to driving, the driver may be able to drive a vehicle having high output or a vehicle having a high torque characteristic due to the improvement in the driving maneuvers. Also, the vehicle having the high output and the vehicle having the torque characteristic such as a racing car are generally expensive. However, getting such a vehicle is also one pleasure for the driver of the MT vehicle. According to the battery electric vehicle described in JP 2021-118569 A, the driver may be able to enjoy a plurality of different torques. However, this is not obtained by the driver's own action, and there is no sense of achievement.

The present disclosure has been made in view of the above issue. One object of the present disclosure is to provide a battery electric vehicle capable of not only causing the driver to enjoy driving feeling as if the driver drives the MT vehicle, but also giving the driver a sense of achievement due to the outcome of the driver's own action.

The present disclosure provides a battery electric vehicle for achieving the above object. The battery electric vehicle according to the present disclosure includes an accelerator pedal, a shifter, a data management device that manages vehicle characteristic data, and a motor control device that controls an electric motor according to the vehicle characteristic data. The vehicle characteristic data is data configured to change an output characteristic of the electric motor with respect to an operation of the accelerator pedal according to an operation position of the shifter. The vehicle characteristic data includes standard vehicle characteristic data and special vehicle characteristic data that has been locked. The data management device is configured to unlock the special vehicle characteristic data when an unlock condition in which a predetermined action of a driver is used as a requirement is satisfied.

With battery electric vehicle according to the present disclosure, the standard vehicle characteristic data can be used even in an initial state, and the driver can enjoy the driving feeling as if the driver drives the MT vehicle due to reflection of the operation of the shifter to a control of the electric motor. Furthermore, when the unlocking condition is satisfied as a result of the driver's own action, the electric motor is controlled according to the special vehicle characteristic data, so that the driver can obtain a sense of achievement due to the enjoyment of the special driving feeling that cannot be obtained by the standard vehicle characteristic data.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

1. Configuring Battery Electric Vehicle

Figure 1:
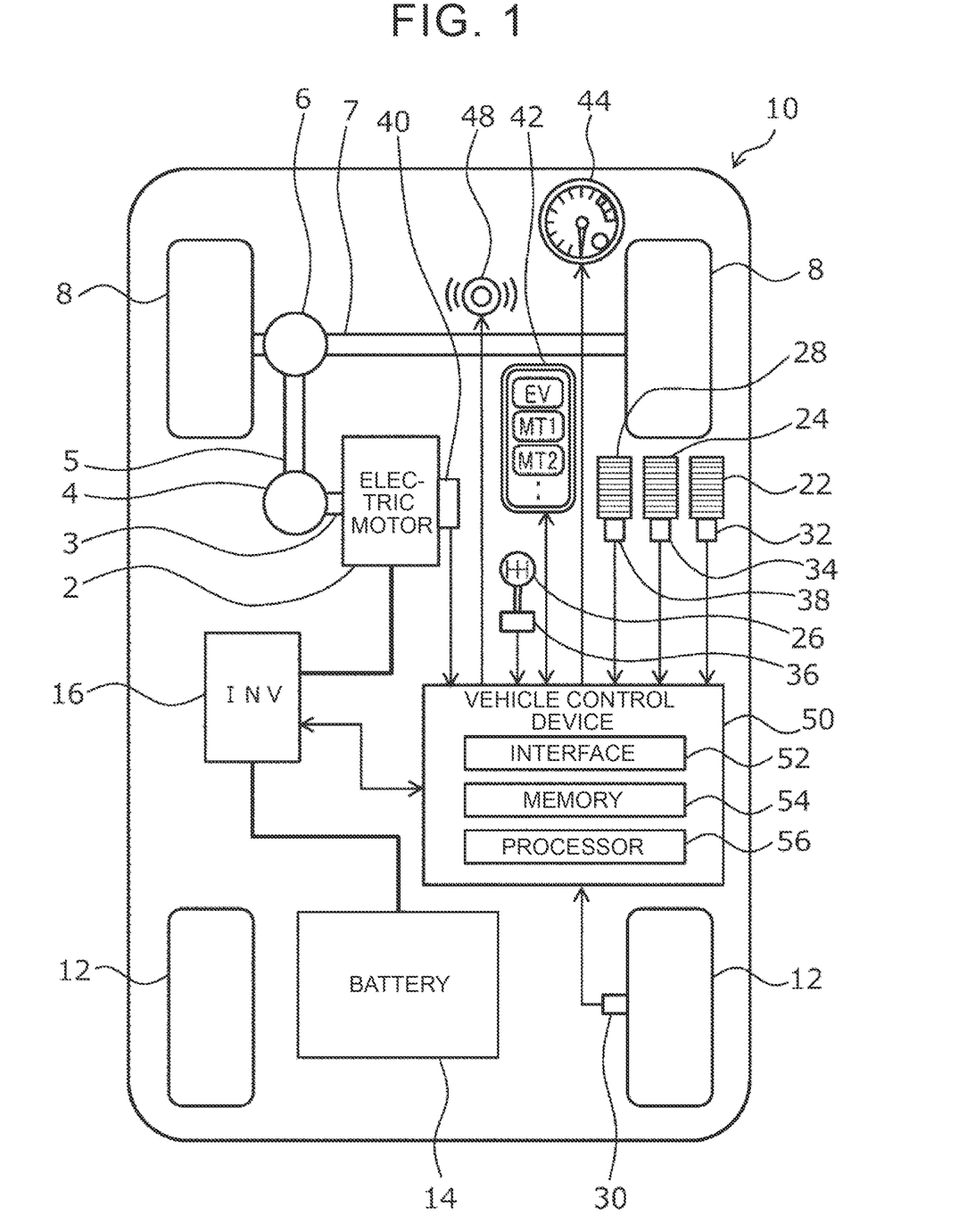
FIG. 1 is a diagram schematically illustrating a configuration of a battery electric vehicle according to an embodiment of the present disclosure.

FIG. 1 is a diagram schematically illustrating a configuration of a power system of a battery electric vehicle 10 according to the present embodiment. As shown in FIG. 1, battery electric vehicle 10 is provided with an electric motor 2 as a driving power device. The electric motor 2 is provided with a rotational speed sensor 40 for detecting the rotational speed thereof. The output shaft 3 of the electric motor 2 is connected to one end of the propeller shaft 5 via a gear mechanism 4. The other end of the propeller shaft 5 is connected to a drive shaft 7 in front of the vehicle via a differential gear 6. Battery electric vehicle 10 includes a drive wheel 8, which is a front wheel, and a driven wheel 12, which is a rear wheel. The drive wheels 8 are respectively provided at both ends of the drive shaft 7. Each of the wheels 8 and 12 is provided with a wheel speed sensor 30. In FIG. 1, only the wheel speed sensor 30 of the right rear wheel is represented. The wheel speed sensor 30 is also used as a vehicle speed sensor for detecting the vehicle speed of battery electric vehicle 10.

Battery electric vehicle 10 includes a battery 14 and inverters 16. The battery 14 stores electric energy for driving the electric motor 2. That is, battery electric vehicle 10 is a battery electric vehicle (BEV) that runs with the electric energy stored in the battery 14. The inverter 16 converts DC power input from the battery 14 into drive power of the electric motor 2 at the time of acceleration. The inverter 16 converts the regenerative electric power input from the electric motor 2 into DC electric power at the time of deceleration, and charges the battery 14.

Battery electric vehicle 10 includes an accelerator pedal 22 for the driver to input an acceleration request for battery electric vehicle 10, and a brake pedal 24 for inputting a braking request. The accelerator pedal 22 is provided with an accelerator position sensor 32 for detecting an accelerator operation amount. The brake pedal 24 is provided with a brake position sensor 34 for detecting a brake depression amount.

Battery electric vehicle 10 comprises a pseudo-H shifter 26. The pseudo H-type shifter 26 has a configuration that simulates an H-type shifter included in MT of the vehicles. The pseudo H-type shifter 26 has positions corresponding to the gear stages of, for example, 1 speed, 2 speed, 3 speed, 4 speed, 5 speed, 6 speed, reverse speed, and neutral. The pseudo H-type shifter 26 is provided with a shift position sensor 36 that detects a gear stage by determining which position the pseudo H-type shifter 26 is in.

Battery electric vehicle 10 includes a pseudo-clutch pedal 28. The pseudo clutch pedal 28 has a configuration simulating a clutch pedal included in MT of the vehicles. When the driver wants to change the setting of the gear stage by the pseudo H-type shifter 26, the driver depresses the pseudo clutch pedal 28. When the change of the setting of the gear stage is completed, the driving vehicle stops depressing and returns the pseudo clutch pedal 28 to its original state. The pseudo clutch pedal 28 is provided with a clutch position sensor 38 for detecting the amount of depression of the pseudo clutch pedal 28.

Battery electric vehicle 10 includes a pseudo engine speed meter 44. The pseudo engine speed meter 44 has a structure simulating an engine rotation speed meter included in a conventional vehicle. The pseudo engine speed meter 44 may be mechanical, liquid crystal display, or projection display using a head-up display. When the pseudo engine speed meter 44 is a liquid crystal display type or a projection display type, the revolution limit can be arbitrarily set. Further, battery electric vehicle 10 includes a speaker 48 in the vehicle cabin.

Battery electric vehicle 10 comprises a mode selection device 42. The mode selection device 42 is a device that selects a battery electric vehicle 10 running mode. The driving modes of battery electric vehicle 10 are roughly classified into a MT mode and an EV mode. MT mode is a control mode for driving battery electric vehicle 10 like MT vehicles. EV mode is a normal control mode for operating battery electric vehicle 10 as a common battery electric vehicle. Furthermore, MT mode can be divided into a standard mode that can be selected by the standard and a special mode that can be selected when a predetermined condition is satisfied. As the mode selection device 42, for example, a touch panel capable of changing the display content by an external signal can be used. A display panel of the navigation device may be used for the mode selection device 42.

Battery electric vehicle 10 includes a vehicle control device 50. Sensors mounted on battery electric vehicle 10 and devices to be controlled are connected to the vehicle control device 50 via an information-communication network. The vehicle control device 50 is typically an electronic control unit (ECU) mounted on a battery electric vehicle 10. The vehicle control device 50 may be a combination of a plurality of ECUs. The vehicle control device 50 includes an interface 52, a memory 54, and a processor 56. An in-vehicle network is connected to the interface 52. The memories 54 include RAM for temporarily recording data and ROM for storing various data related to programs and programs executable by the processor 56. The program is composed of a plurality of instructions. The processor 56 reads and executes programs and data from the memory 54. The processor 56 then generates a control signal based on the signal obtained from each sensor.

Figure 2:
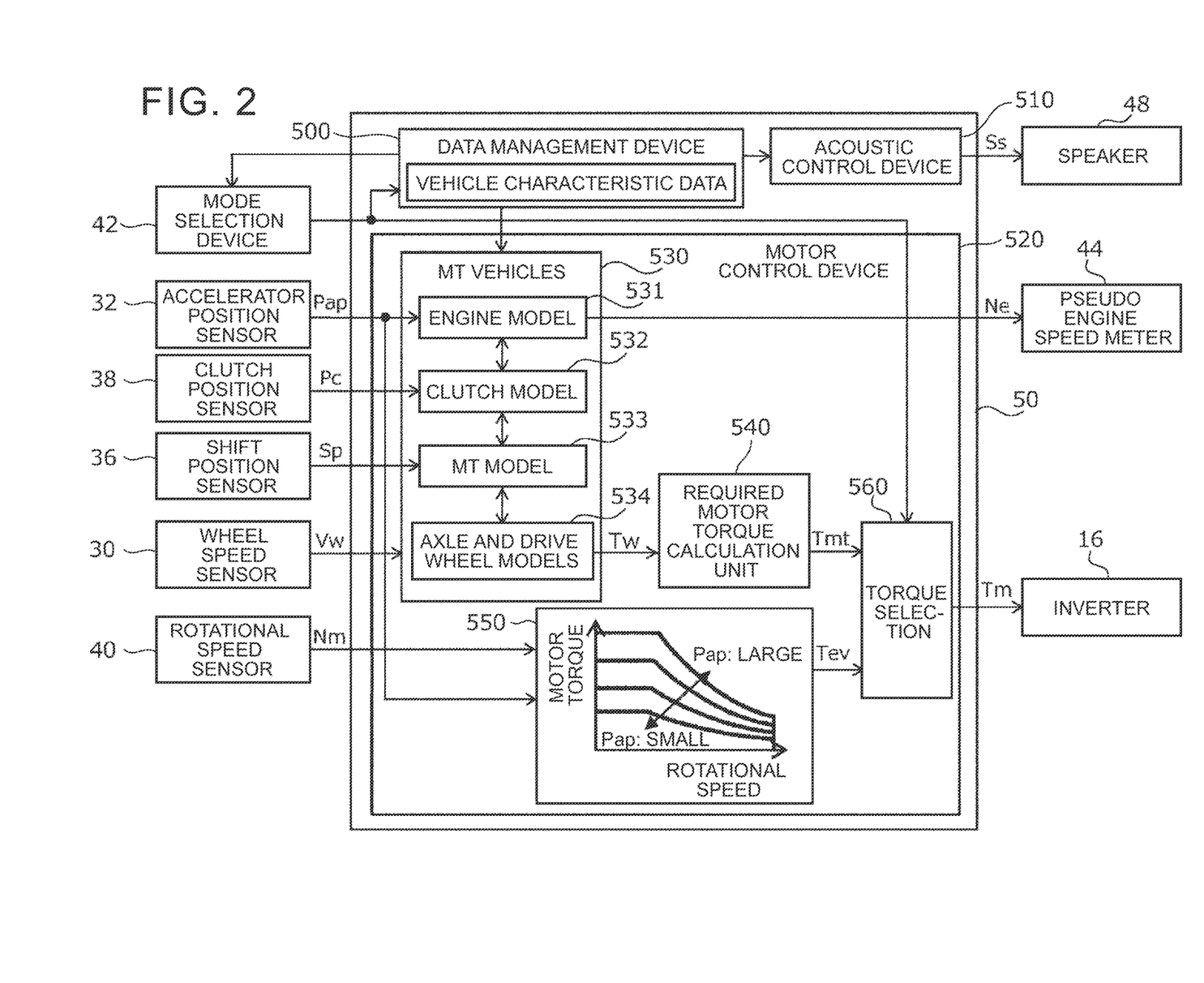
FIG. 2 is a block-diagram illustrating a configuration of a vehicle control device of battery electric vehicle.

FIG. 2 is a block diagram illustrating a configuration of the vehicle control device 50. The vehicle control device 50 receives inputs of signals from at least the wheel speed sensor 30, the accelerator position sensor 32, the brake position sensor 34, the shift position sensor 36, the clutch position sensor 38, the rotational speed sensor 40, and the mode selection device 42. Further, the vehicle control device 50 outputs a signal to at least the inverter 16, the pseudo engine speed meter 44, and the speaker 48. The vehicle control device 50 includes a data management device 500, an acoustic control device 510, and a motor control device 520. Specifically, when the program stored in the memory 54 is executed by the processor 56, the processor 56 functions as at least the data management device 500, the acoustic control device 510, and the motor control device 520. Hereinafter, each device constituting the vehicle control device 50 will be described.

2. Configuration of Vehicle Control Device 2-1. Data Management Device

The data management device 500 is a device that manages vehicle characteristic data used for vehicle control in MT mode. The vehicle property data includes a MT vehicle model and sound data. MT vehicle model is a model configured to change an output characteristic of the electric motor 2 with respect to an operation of the accelerator pedal 22 in accordance with an operation position of the pseudo-H type shifter 26. The sound data is data of sound effects such as exhaust sound of the engine, intake sound, and gear sound generated from MT. The audio data is associated with MT vehicle model.

The vehicle characteristic data includes standard vehicle characteristic data corresponding to the standard mode of MT mode and special vehicle characteristic data corresponding to the special mode of MT mode. When MT mode selected by the mode selection device 42 is the standard mode, the data management device 500 sets the standard MT vehicle model included in the standard vehicle characteristic data to the motor control device 520, and sets the standard sound data included in the standard vehicle characteristic data to the acoustic control device 510. When MT mode selected by the mode selection device 42 is the special mode, the data managing device 500 sets the special MT vehicle model included in the special vehicle characteristic data to the motor control device 520, and sets the special sound data included in the special vehicle characteristic data to the acoustic control device 510.

2-2. Acoustic Control Device

The acoustic control device 510 is a device that controls the speaker 48 according to the sound data set by the data management device 500. When the sound data is standard sound data or special sound data, and when there is a plurality of special sound data, the volume, the height, or the type of sound of the sound effect emitted from the speaker 48 is different for each special sound data.

2-3. Motor Control Device

The motor control device 520 is a device that controls the electric motor 2 by PWM control of the inverters 16. The motor control device 520 includes a MT vehicle model 530, a required motor torque calculation unit 540, a motor torque command map 550, and an output torque switching unit 560. MT vehicle model 530 is a MT vehicle model set by the data management device 500 in accordance with a selection by the mode selection device 42. Signals from the wheel speed sensor 30, the accelerator position sensor 32, the shift position sensor 36, the clutch position sensor 38, the rotational speed sensor 40, and the mode selection device 42 are input to the motor control device 520. The motor control device 520 processes signals from these sensors. The motor control device 520 calculates a motor torque command for controlling PWM of the inverters 16.

There are two types of calculation of the motor torque by the motor control device 520: calculation using MT vehicle model 530 and the required motor torque calculation unit 540; and calculation using the motor torque command map 550. MT vehicle model 530 and the required motor torque calculation unit 540 are used to calculate the motor torque when battery electric vehicle 10 is driven in MT mode. The motor torque command map 550 is used to calculate the motor torque when battery electric vehicle 10 is driven in EV mode. Which motor torque is used is determined by the output torque switching unit 560.

MT vehicle model 530 is a model that calculates the drive wheel torque that should be obtained by operating the accelerator pedal 22, the pseudo-H shifter 26, and the pseudo-clutch pedal 28, assuming that battery electric vehicle 10 is a MT vehicle. Engines, clutches, and manual transmissions (MT) virtually implemented by MT vehicle model 530 are referred to as virtual engines, virtual clutches, and virtual MT, respectively. The configuration of MT vehicle-model 530 will be described later.

The required motor torque calculation unit 540 converts the drive wheel torque Tw calculated by MT vehicle model 530 into a required motor torque Tmt. The required motor torque Tmt is the motor torque required to realize the drive wheel torque Tw calculated by MT vehicle model 530. In order to convert the drive wheel torque Tw into the required motor torque Tmt, a reduction ratio from the output shaft 3 of the electric motor 2 to the drive wheels 8 is used.

The motor torque command map 550 is a map for determining the motor torque from the accelerator operation amount and the rotational speed of the electric motor 2. A signal of the accelerator position sensor 32 and a signal of the rotational speed sensor 40 are input to each parameter of the motor torque command map 550. A motor torque Tev corresponding to these signals is outputted from the motor torque command map 550. In EV mode, even if the driver operates the pseudo H-type shifter 26 or the pseudo clutch pedal 28, the operation is not reflected in the operation of battery electric vehicle 10.

The output torque switching unit 560 operates in accordance with the control mode selected by the mode selection device 42. When EV mode is selected by the mode selection device 42, the output torque switching unit 560 is connected to the motor torque command map 550 and outputs the motor torque Tev as the motor torque command Tm to the inverter 16. When MT mode is selected by the mode selection device 42, the output torque switching unit 560 switches the connection destination to the required motor torque calculation unit 540, and outputs the motor torque Tmt as the motor torque command to the inverter 16.

Figure 3:
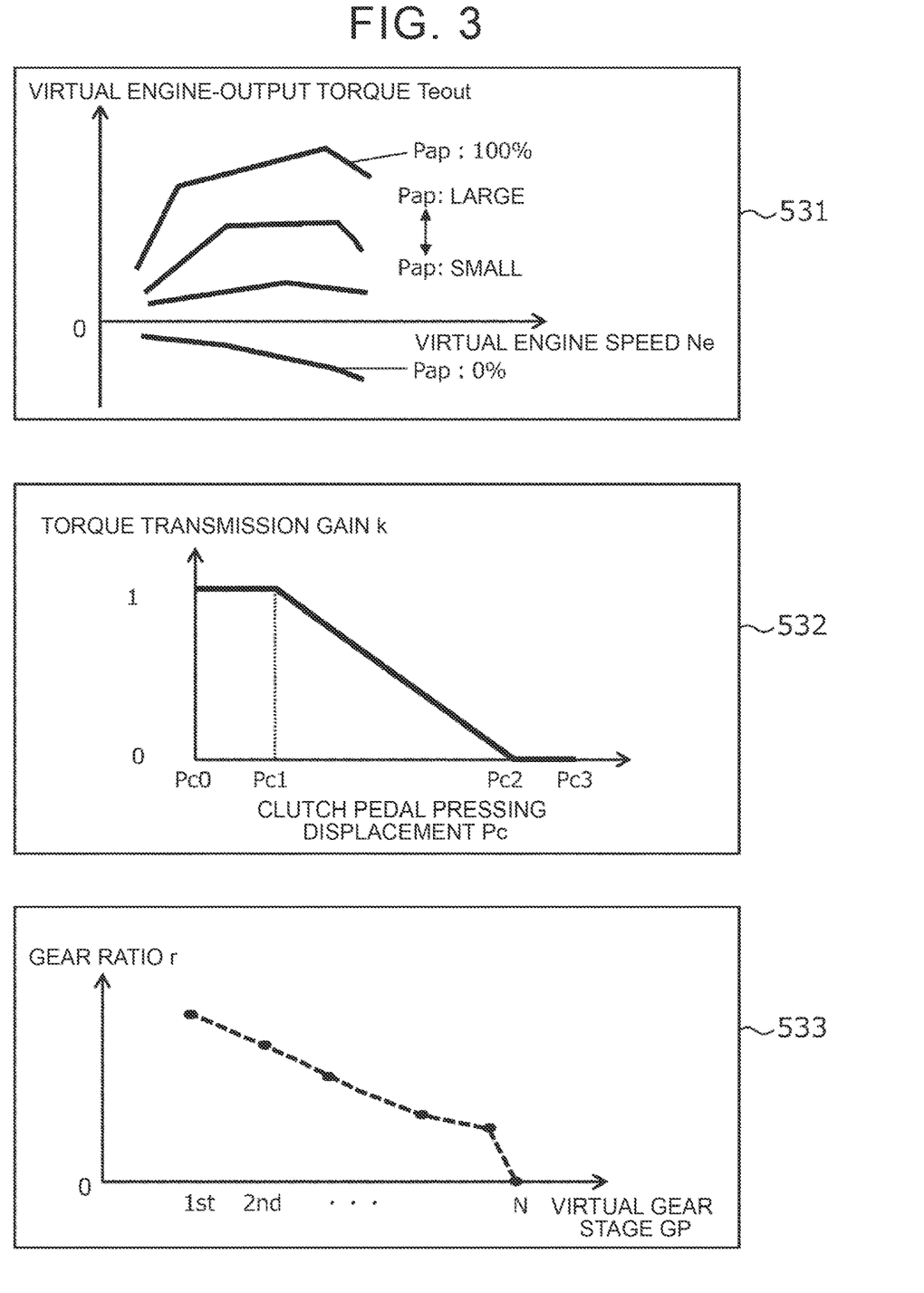
FIG. 3 is a diagram illustrating an engine model, a clutch model, and a transmission model constituting a MT vehicle model.

MT vehicle model 530 will now be described. MT vehicle model 530 includes an engine model 531, a clutch model 532, a MT model 533, and an axle/drive wheel model 534. In the engine model 531, the virtual engine is modeled. In the clutch model 532, the virtual clutch is modeled. In MT model 533, the virtual MT is modeled. In the axle/drive wheel model 534, a virtual torque transmission system from the axle to the drive wheels is modeled.

MT vehicle-model 530 is calculated by using the sensor. The accelerator operation amount Pap detected by the accelerator position sensor 32 is inputted to the engine model 531. The clutch pedal depression amount Pc detected by the clutch position sensor 38 is inputted to the clutch model 532. The shift position Sp detected by the shift position sensor 36 is inputted to MT 533. The vehicle speed Vw detected by the wheel speed sensor 30 is used in a plurality of models. Furthermore, calculation results are mutually used between the models. MT vehicle-model 530 calculates the drive wheel-torque Tw and the virtual engine speed Ne based on these input-signals.

The engine model 531 calculates a virtual engine speed Ne and a virtual engine power torque Teout. The engine model 531 includes a model for calculating the virtual engine speed Ne and a model for calculating the virtual engine output torque Teout. For example, the following equation (1) is used to calculate the virtual engine speed Ne. In the following equation (1), the virtual engine speed Ne is calculated from the rotational speed Nw of the wheel 8, the overall reduction ratio R, and the slip-rate Rslip of the virtual clutch.

Mathematical formula 1

$$Ne = Ne \times R \times \frac{1}{1 - Rslip} \tag{1}$$

In Equation (1), the rotational speed Nw of the wheel 8 is detected by the wheel speed sensor 30. The overall reduction ratio R is calculated from the gear ratio (transmission ratio) r calculated by MT model 533 described later and the reduction ratio defined by the axle/drive wheel model 534. The slip-rate Rslip is calculated by a later-described clutch-model 532. The virtual engine speed Ne is displayed on the pseudo engine speed meter 44 when MT mode is selected.

Equation (1) is a formula for calculating the virtual engine speed Ne when the virtual engine and the virtual MT are connected by the virtual clutch. If the virtual clutch is disengaged, the virtual engine torque Te generated in the virtual engine may be considered to be used to increase the virtual engine speed Ne. The virtual engine torque Te is the torque obtained by adding the torque by the moment of inertia to the virtual engine output torque Teout. When the virtual clutch is disengaged, the virtual engine-output-torque Teout is zero. Therefore, when the virtual clutch is disengaged, the engine model 531 calculates the virtual engine speed Ne using the virtual engine torque Te and the moment of inertia J of the virtual engine according to the following equation (2). In calculating the virtual engine torque Te, a map having an accelerator operation amount Pap as a parameter is used.

Mathematical formula 2

$$I \times \frac{30}{\pi} \times \frac{d}{dt} Ne = Te \tag{2}$$

The engine model 531 calculates a virtual engine output torque Teout from the virtual engine speed Ne and the accelerator operation amount Pap. For example, a map as shown in FIG. 3 is used to calculate the virtual engine-output-torque Teout. This map defines the relation between the accelerator operation amount Pap, the virtual engine speed Ne, and the virtual engine output torque Teout in the steady-state. In this map, a virtual engine output torque Teout with respect to the virtual engine speed Ne is given for each accelerator operation amount Pap. The torque characteristic shown in FIG. 3 may be set to a characteristic assumed for a gasoline engine, or may be set to a characteristic assumed for a diesel engine. In addition, the characteristics of the natural intake engine can be set to the assumed characteristics, or the characteristics of the supercharged engine can be set to the assumed characteristics. In the data management device 500, special vehicle characteristic data of such various torque characteristics may be prepared. The virtual engine output torque Teout calculated by the engine model 531 is inputted to the clutch model 532.

The clutch model 532 calculates a torque transmission gain k. The torque transmission gain k is a gain for calculating the degree of torque transmission of the virtual clutch according to the amount of depression of the pseudo clutch pedal 28. The clutch model 532 has, for example, a map as shown in FIG. 3. In this map, the torque transmission gain k is given to the clutch pedal depression amount Pc. In FIG. 3, Pc0 corresponds to a position where the clutch-pedal depression amount Pc is 0%. In FIG. 3, Pc1 corresponds to the position of the play limit when the clutch pedal is depressed. In FIG. 3, Pc3 corresponds to a position where the clutch-pedal depression amount Pc is 100%. In FIG. 3, Pc2 corresponds to the position of the play limit when returning the clutch pedal from Pc3.

The clutch model 532 calculates the clutch output torque Tcout using the torque transmission gain k. The clutch output torque Tcout is torque output from the virtual clutch. For example, the clutch model 532 calculates the clutch output torque Tcout from the virtual engine output torque Teout and the torque transmission gain k by the following equation (3). The clutch output torque Tcout calculated by the clutch model 532 is inputted to MT model 533.

Mathematical formula 3

$$Tcout = Teout \times k \qquad (3)$$

In addition, the clutch model 532 calculates the slip ratio Rslip. The slip-rate Rslip is used to calculate the virtual engine speed Ne in the engine model 531. The slip ratio Rslip can be calculated using a map in which the slip ratio Rslip is given to the clutch-pedal depression amount Pc in the same manner as the torque-transmission gain k. Instead of such a map, the slip ratio Rslip may be calculated from the torque transmission gain k by the following equation (4) representing the relation between the slip ratio Rslip and the torque transmission gain.

Mathematical formula 4

$$Rslip = 1 - k \qquad (4)$$

MT modeling 533 calculates a gear ratio r. The gear ratio r is a gear ratio determined by the virtual gear stage GP in the virtual MT. MT modeling 533 includes, for example, a map as illustrated in FIG. 3. In this map, the gear ratio r is given to the virtual gear stage GP. As shown in FIG. 3, the larger the virtual gear stage GP, the smaller the gear ratio r. MT modeling 533 calculates the transmission output-torque Tgout using the gear ratio r. The transmission output torque Tgout is the torque output from the virtual MT. For example, MT modeling 533 calculates the transmission output torque Tgout from the clutch output torque Tcout and the gear ratio r by the following equation (5). The transmission output-torque Tgout calculated by MT model 533 is inputted to the axle/drive wheel model 534.

Mathematical formula 5

$$Tgout = Tcout \times r \qquad (5)$$

The axle/drive wheel model 534 calculates the drive wheel torque Tw using a predetermined reduction ratio rr. The reduction ratio rr is a fixed value determined by the mechanical structure from the virtual MT to the drive wheels 8. The overall reduction ratio R is obtained by multiplying the reduction ratio rr by the gear ratio r. For example, the axle/drive wheel model 534 calculates the drive wheel torque Tw from the transmission output torque Tgout and the reduction ratio rr by the following equation (6). The drive wheel torque Tw calculated by the axle/drive wheel model 534 is outputted to the required motor torque calculation unit 540.

Mathematical formula 6

$$Tw = Tgout \times rr \qquad (6)$$

3. Details of the Data Management Device

Figure 4:
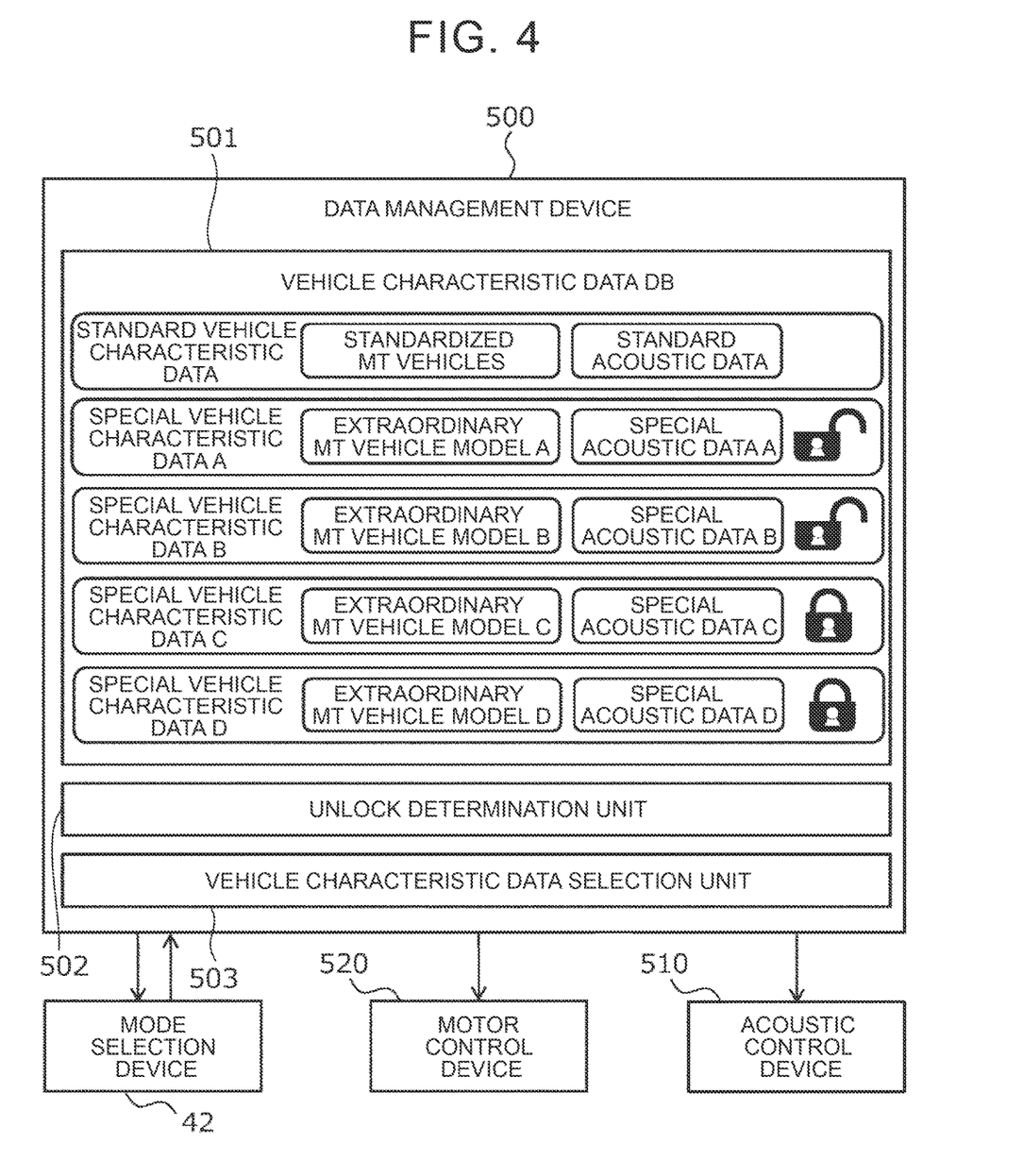
FIG. 4 is a block diagram illustrating an example of a configuration of a data management device.

Next, details of the data management device 500 will be described with reference to the drawings. FIG. 4 is a block diagram illustrating an example of a configuration of the data management device 500. In the embodiment illustrated in FIG. 4, the data management device 500 includes a vehicle characteristic data DB501, an unlock determination unit 502, and a vehicle characteristic data selection unit 503.

The vehicle characteristic data DB501 is a database in which a plurality of vehicle characteristic data is registered. The registered vehicle characteristic data includes standard vehicle characteristic data and special vehicle characteristic data. The standard vehicle characteristic data is vehicle characteristic data that can be selected by the standard. The special vehicle characteristic data is vehicle characteristic data that can be selected when a predetermined unlocking condition is satisfied. A lock is not provided in the standard vehicle characteristic data, whereas a lock is provided in the special vehicle characteristic data. In the example illustrated in FIG. 4, the registered special vehicle characteristic data is four sets of data A, data B, data C. and data D. Of these, the special vehicle characteristic data C-D remains locked, while the special vehicle characteristic data A-B is unlocked.

The vehicle characteristic data registered in the vehicle characteristic data DB501 is reflected in the mode selection device 42. Among the registered vehicle characteristic data, a standard mode corresponding to the standard vehicle characteristic data and a special mode corresponding to the special vehicle characteristic data whose lock is released are displayed on the touch panel of the mode selection device 42. In the embodiment shown in FIG. 4, two special modes corresponding to the special vehicle characteristic data A-B can be selected in the mode selection device 42.

The unlock determination unit 502 determines whether or not the unlock condition is satisfied for each special vehicle characteristic data to which the lock is applied. The unlock condition is a condition requiring a predetermined action of the driver. A specific example of the unlock condition will be described later. The unlock determination unit 502 releases the lock of the special vehicle characteristic data that is requested to be unlocked by the driver and satisfies the lock release condition. For example, when the lock release condition of the special vehicle characteristic data C is satisfied, the unlock determination unit 502 releases the lock of the special vehicle characteristic data C. When the lock is released, a special mode corresponding to the special vehicle characteristic data C can be selected by the mode selection device 42.

The vehicle characteristic data selection unit 503 selects vehicle characteristic data corresponding to the control mode selected by the mode selection device 42. The control mode selected by the mode selection device 42 is MT mode. When MT mode is the standard mode, the vehicle characteristic data selection unit 503 selects the standard vehicle characteristic data. When the selected MT mode is the special mode, the vehicle characteristic data selection unit 503 selects the special vehicle characteristic data corresponding to the selected special mode. The data management device 500 sets MT vehicle model included in the vehicle characteristic data selected by the vehicle characteristic data selection unit 503 in the motor control device 520. Then, the data management device 500 sets the acoustic data included in the selected vehicle characteristic data in the acoustic control device 510.

Figure 5:
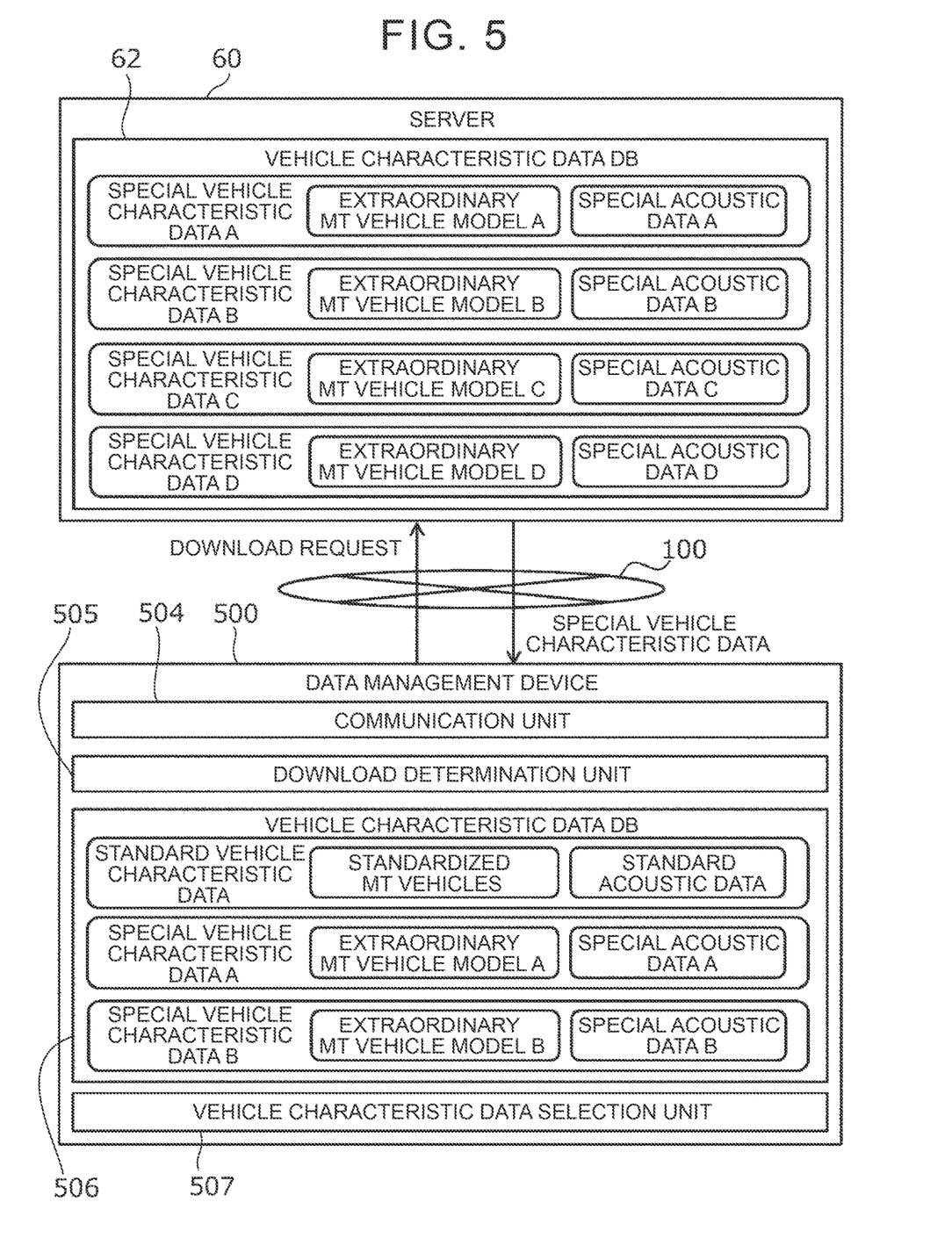
FIG. 5 is a block-diagram illustrating another exemplary configuration of a data management device.

FIG. 5 is a block diagram illustrating another example of the configuration of the data management device 500. In the embodiment illustrated in FIG. 5, the data management device 500 includes a communication unit 504, a download determination unit 505, a vehicle characteristic data DB506, and a vehicle characteristic data selection unit 507.

The communication unit 504 connects to the server 60 on the network 100 using mobile communication. The server 60 comprises a vehicle-characteristic-data DB62. The vehicle characteristic data DB62 is a database in which a plurality of pieces of special vehicle characteristic data is registered. In the embodiment illustrated in FIG. 4, the special vehicle characteristic data registered in the vehicle characteristic data DB62 is four sets of data A, data B, data C, and data D.

The download determination unit 505 determines whether or not the download condition is satisfied for each of the special vehicle characteristic data registered in the vehicle characteristic data DB62. The download condition is a condition requiring a predetermined action of the driver, and the content thereof is the same as the unlock condition described above. The download determination unit 505 downloads, from the server 60, the special vehicle characteristic data that is requested to be downloaded by the driver and satisfies the download condition. For example, when the download condition of the special vehicle characteristic data C is satisfied, the download determination unit 505 downloads the special vehicle characteristic data C. The special vehicle characteristic data on the server 60 is only available by being downloaded. Thus, the special vehicle characteristic data on the server 60 is substantially equal to being locked, and downloading it is equal to unlocking.

The vehicle characteristic data DB506 is a database in which the standard vehicle characteristic data and the special vehicle characteristic data downloaded from the servers are registered. Standard vehicle characteristic data is initially registered in the vehicle characteristic data DB506. The vehicle characteristic data registered in the vehicle characteristic data DB506 is reflected in the mode selection device 42. In the embodiment illustrated in FIG. 5, the special vehicle characteristic data A-B is registered in the vehicle characteristic data DB506. Therefore, a standard mode corresponding to the standard vehicle characteristic data and two special modes corresponding to the special vehicle characteristic data A-B can be selected in the mode selection device 42.

The vehicle characteristic data selection unit 507 selects vehicle characteristic data corresponding to the control mode selected by the mode selection device 42 from the vehicle characteristic data DB506. MT vehicle model included in the vehicle characteristic data selected by the vehicle characteristic data selection unit 507 is set in the motor control device 520. The acoustic data included in the selected vehicle characteristic data is set in the acoustic control device 510.

Figure 6:
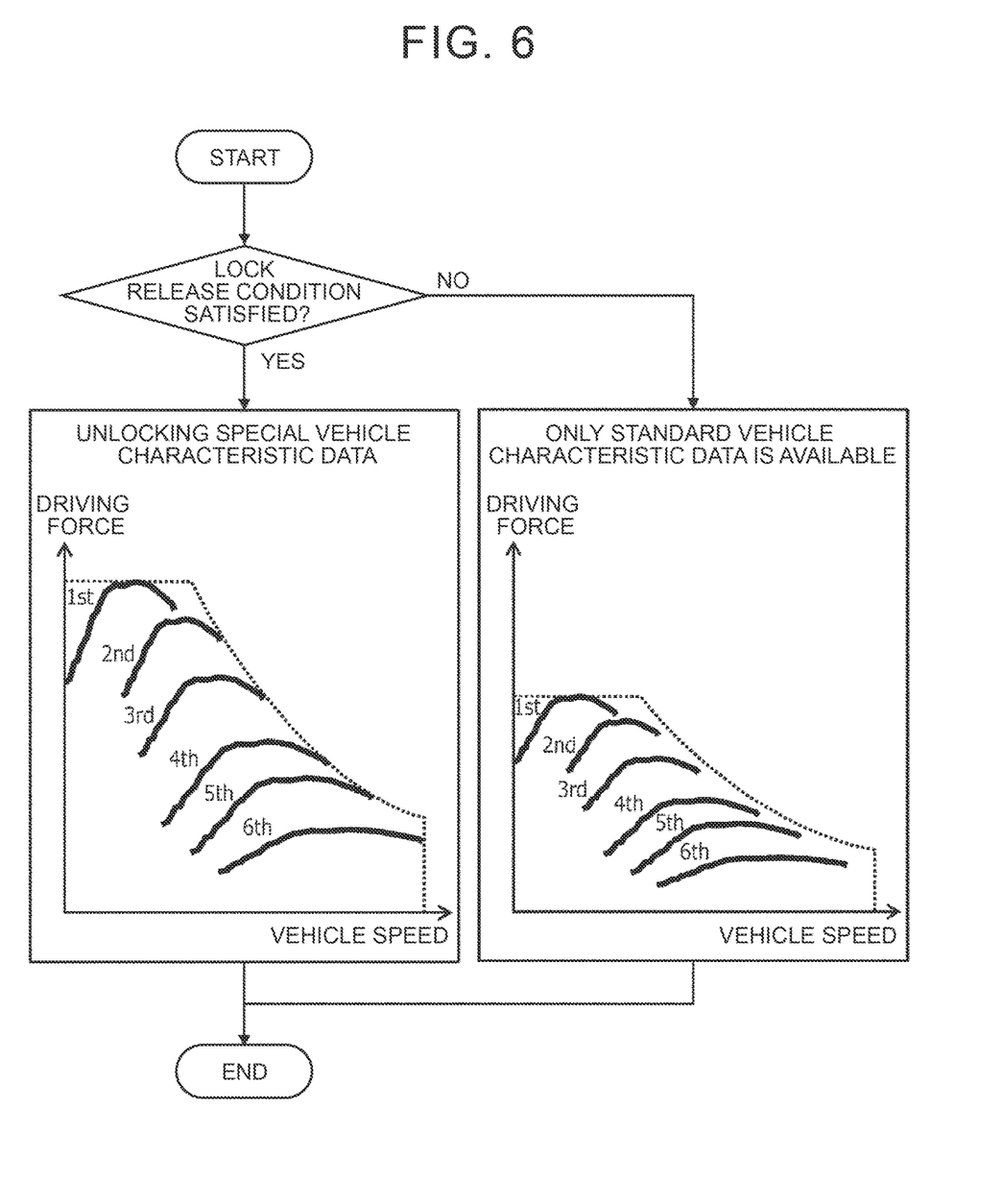
FIG. 6 is a diagram illustrating a process performed by data management device.

FIG. 6 is a flowchart illustrating processing performed by the data management device 500. The process illustrated in this flowchart is a process common to the configuration illustrated in FIG. 4 and the configuration illustrated in FIG. 5. Here, it is assumed that both the standard vehicle characteristic data and the special vehicle characteristic data are one set.

When the unlock condition is not satisfied, the vehicle characteristic data available in the data management device 500 is only the standard vehicle characteristic data. When the lock release condition is satisfied, the lock of the special vehicle characteristic data is released. Then, special vehicle characteristic data is also available in the data management device 500. In the example shown in FIG. 6, the standard vehicle characteristic data has a lower driving force for the same vehicle speed in all gear stages as compared with the special vehicle characteristic data. This means that the standard vehicle characteristic data is configured to reduce the output of the electric motor 2 to the same manipulated variable of the accelerator pedal 22 at all operating positions of the pseudo H-shifter 26 as compared to the special vehicle characteristic data.

According to the standard vehicle characteristic data and the special vehicle characteristic data as illustrated in FIG. 6, when the standard vehicle characteristic data is selected, the driving force output can be suppressed, and thus the driving can be performed without anxiety. When the lock is released and the special vehicle characteristic data can be selected, the driver can obtain a new drivability experience by driving with a higher driving force. The unlock condition is a condition requiring a predetermined action of the driver. An example of an unlocking condition requiring the driver's action is as follows.

A first example of the unlocking condition is that the degree of skill calculated from the driver's driving history reaches a predetermined passing value. The driving history includes, for example, parameters such as the total traveling distance in MT mode, the traveling speed with respect to the set speed of the road, the magnitude of the acceleration/deceleration, the shift timing, and the presence or absence of a shock when the clutch pedal is operated. From the sum of the scores given to these parameters, the proficiency is calculated. The predetermined action of the driver in the first example is to increase the skill level to a passing value or more. By using new vehicle characteristic data as a result of improved driving skill, it is possible to obtain a sense of achievement by enjoying a special driving sensation that cannot be obtained by the standard vehicle characteristic data.

When there is a plurality of special vehicle characteristic data and the maximum driving force is different for each special vehicle characteristic data, the higher the driving force, the higher the passing value of the skill level as the unlocking condition is. In addition, when there are special vehicle characteristic data having output characteristics of a high rotation type and special vehicle characteristic data having output characteristics of a medium and low speed type, the high rotation type has a higher passing value of the skill level. When special vehicle characteristic data having an output characteristic for a circuit is present, a passing value of the skill level may be set to be specially high. In the example shown in FIG. 4 and the example shown in FIG. 5, the special vehicle characteristic data A and B are unlocked, but the special vehicle characteristic data C and D remain locked. This means that the special vehicle characteristic data C. D require higher driving skill for unlocking than the special vehicle characteristic data A, B.

A second example of the unlocking condition is that a fee for the use of the special vehicle characteristic data is charged. The predetermined action of the driver in the second example is to charge a fee. There is a need to prepare the necessary funds for billing. Then, it is necessary to make appropriate efforts according to the amount of funds to be prepared. Therefore, it can be said that the charge of the price is one of the actions which leads to the sense of achievement.

When a plurality of pieces of special vehicle characteristic data exists and the maximum driving force is different for each piece of special vehicle characteristic data, the higher the driving force is, the higher the charge amount that is the unlocking condition is. In the example shown in FIG. 4 and the example shown in FIG. 5, the special vehicle characteristic data A and B are unlocked, but the special vehicle characteristic data C and D remain locked. This means that the special vehicle characteristic data C. D, rather than the special vehicle characteristic data A, B, require a higher amount of compensation for unlocking. It should be noted that MT vehicle models may be the same, and the amount of consideration may be changed depending on the difference in sound-effect data. For example, a higher amount of consideration may be required for the special vehicle characteristic data having the acoustic effect data modeling the V-8 cylinder engine than the special vehicle characteristic data having the acoustic effect data modeling the series 4 cylinder engine.

4. Other

In the above embodiment, a pseudo sequential shifter may be provided instead of the pseudo H-type shifter. Further, the pseudo clutch pedal may be omitted. MT vehicle model may be a model of a clutch pedal-less MT vehicle without a clutch pedal. The pseudo sequential shifter may be a puddle-type pseudo shifter or a lever-type pseudo shifter.

In the configuration of the data management device 500 illustrated in FIG. 5, the download of the special vehicle characteristic data from the server 60 may be performed by a mobile terminal such as a smartphone or a tablet carried by the operator. Then, the special vehicle characteristic data downloaded from the mobile terminal to the data management device 500 may be transferred.

What is claimed is:

1. A battery electric vehicle, comprising:
a drive wheel
an electric motor that outputs a driving force to the drive wheel;
an accelerator pedal;
a shifter;
a clutch pedal;
a vehicle speed sensor;
a brake pedal; and
a processor configured to:
    manage vehicle characteristic data configured to change an output characteristic of the electric motor with respect to an operation of the accelerator pedal according to an operation position of the shifter; and
    control the electric motor based on the vehicle characteristic data, wherein:
the vehicle characteristic data includes standard vehicle characteristic data and special vehicle characteristic data, the special vehicle characteristic data being locked until an unlock condition is satisfied, the special vehicle characteristic data including a first special vehicle characteristic data; and
the processor is configured to
    calculate a degree of driver skill based on a driving history including parameters comprising a total traveling distance in a manual transmission mode, a traveling speed relative to a speed limit of a road, a magnitude of acceleration and deceleration, a shift timing, and a presence or absence of clutch-induced shock during operation of the clutch pedal,
    determine whether the calculated degree of skill exceeds a first threshold value associated with a first output characteristic corresponding to a first rotation speed of the electric motor, and
    unlock the first special vehicle characteristic data in response to determining that the calculated degree of skill exceeds the first threshold value.

2. The battery electric vehicle according to claim 1, wherein
the standard vehicle characteristic data suppresses output of the electric motor to a lower level in response to an identical operation amount of the accelerator pedal in all shift lever positions, as compared to the special vehicle characteristic data.

3. The battery electric vehicle according to claim 1, wherein:
the special vehicle characteristic data includes a second special vehicle characteristic data having acoustic effect data modeling a V-8 cylinder engine and a third special vehicle characteristic data having acoustic effect data modeling a series 4 cylinder engine,
the processor is configured to unlock the second special vehicle characteristic data in response to charging a fee being charged for use of the second special vehicle characteristic data; and
a fee required to unlock the second special vehicle characteristic data is higher than a fee required to unlock the third special vehicle characteristic data.

4. The battery electric vehicle according to claim 1, wherein:
the special vehicle characteristic data is stored on a server on a network; and
unlocking the special vehicle characteristic data includes downloading the special vehicle characteristic data from the server.

5. The battery electric vehicle according to claim 1, wherein:
the special vehicle characteristic data includes a second special vehicle characteristic data having a second output characteristic of a second rotation speed of the electric motor and a third special vehicle characteristic data having a third output characteristic of a third rotation speed of the electric motor, the second rotation speed being larger than the first rotation speed, and the third rotation speed being larger than the second rotation speed, the processor is configured to:
- determine whether the calculated degree of skill exceeds a second threshold value that is larger than the first threshold value and unlock the second special vehicle characteristic data in response to determining that the calculated degree of skill exceeds the second threshold value; and
- determine whether the calculated degree of skill exceeds a third threshold value that is larger than the second threshold value and unlock the third special vehicle characteristic data in response to determining that the calculated degree of skill exceeds the third threshold value.

6. A system comprising;
- a server storing vehicle characteristic data that includes standard vehicle characteristic data and special vehicle characteristic data that has been locked, the special vehicle characteristic data including a first special vehicle characteristic data; and
- a battery electric vehicle, including:
  - a drive wheel;
  - an electric motor that outputs a driving force to the drive wheel;
  - an accelerator pedal;
  - a shifter;
  - a clutch pedal;
  - a vehicle speed sensor;
  - a brake pedal; and
  - a processor configured to:
    - manage the vehicle characteristic data configured to change an output characteristic of the electric motor with respect to an operation of the accelerator pedal according to an operation position of the shifter;
    - control the electric motor according to the vehicle characteristic data;
    - calculate a degree of driver skill based on a driving history including parameters comprising a total traveling distance in a manual transmission mode, a traveling speed relative to a speed limit of a road, a magnitude of acceleration and deceleration, a shift timing, and a presence or absence of clutch-induced shock during operation of the clutch pedal;
    - determine whether the calculated degree of skill calculated exceeds a first threshold value associated with a first output characteristic corresponding to a first rotation speed of the electric motor;
    - unlock the first special vehicle characteristic data in response to determining that the calculated degree of skill exceeds the first threshold value;
    - display a mode corresponding to the first special vehicle characteristic data on a touch panel; and
    - download the first special vehicle characteristic data from the server in response to user selection of the displayed mode on the touch panel.

7. The system according to claim 6, wherein:
the special vehicle characteristic data includes a second special vehicle characteristic data having a second output characteristic of a second rotation speed of the electric motor and a third special vehicle characteristic data having a third output characteristic of a third rotation speed of the electric motor, the second rotation speed being larger than the first rotation speed, and the third rotation speed being larger than the second rotation speed; and the processor is configured to:
- determine whether the calculated degree of skill exceeds a second threshold value that is larger than the first threshold value and unlock the second special vehicle characteristic data in response to determining that the calculated degree of skill exceeds the second threshold value; and
- determine whether the calculated degree of skill exceeds a third threshold value that is larger than the second threshold value and unlock the third special vehicle characteristic data in response to determining that the calculated degree of skill exceeds the third threshold value.

8. The system according to claim 7, wherein the third special vehicle characteristic data has an output characteristic for a circuit.

9. The system according to claim 6, wherein the first special vehicle characteristic data has an output characteristic for a circuit.

* * * * *